United States Patent [19]

Westermeir et al.

[11] Patent Number: 5,576,686

[45] Date of Patent: Nov. 19, 1996

[54] SWITCH ARRANGEMENT FOR REDUCING THE CLOSED CIRCUIT CURRENT WHEN MOTOR VEHICLES ARE PARKED

[75] Inventors: Gerhard Westermeir, Parsdorf; Reinhard Busch, Icking; Johann Leupolz, Amberg, all of Germany

[73] Assignee: Bayerische Motoren Werke AG, Munich, Germany

[21] Appl. No.: 332,806

[22] Filed: Nov. 2, 1994

[30] Foreign Application Priority Data

Nov. 2, 1993 [DE] Germany ............ 43 37 274.0

[51] Int. Cl.⁶ .................................... B60R 25/10
[52] U.S. Cl. ................ 340/426; 340/425.5; 340/636; 307/10.7; 307/9.1
[58] Field of Search ................ 340/426, 425.5, 340/635, 636, 664; 307/10.2, 10.7, 9.1

[56] References Cited

U.S. PATENT DOCUMENTS 5,133,426  7/1992  Niriella et al. .................... 340/426
5,140,250  8/1992  Morland ............................ 307/10.7
5,170,151  12/1992  Hochstein ......................... 307/10.7

FOREIGN PATENT DOCUMENTS 0225492  6/1987  European Pat. Off. .
3742312  6/1989  Germany .
4040405  7/1992  Germany .

*Primary Examiner*—Donnie L. Crosland
*Attorney, Agent, or Firm*—Evenson, McKeown, Edwards & Lenahan, P.L.L.C.

[57] ABSTRACT

In the case of a switch arrangement for reducing the closed circuit current when motor vehicles are parked, including a controllable switch for the central disconnecting essentially of all power supply consuming devices from the motor vehicle battery, the electric supply input of an electric anti-theft device is inseparably connected with the motor vehicle battery. The electric anti-theft device receives an input signal corresponding to the position of the controllable switch and queries the position of a manually operable switch for sensitizing and desensitizing the anti-theft device less often when the controllable switch is open than when the controllable switch is closed.

15 Claims, 1 Drawing Sheet

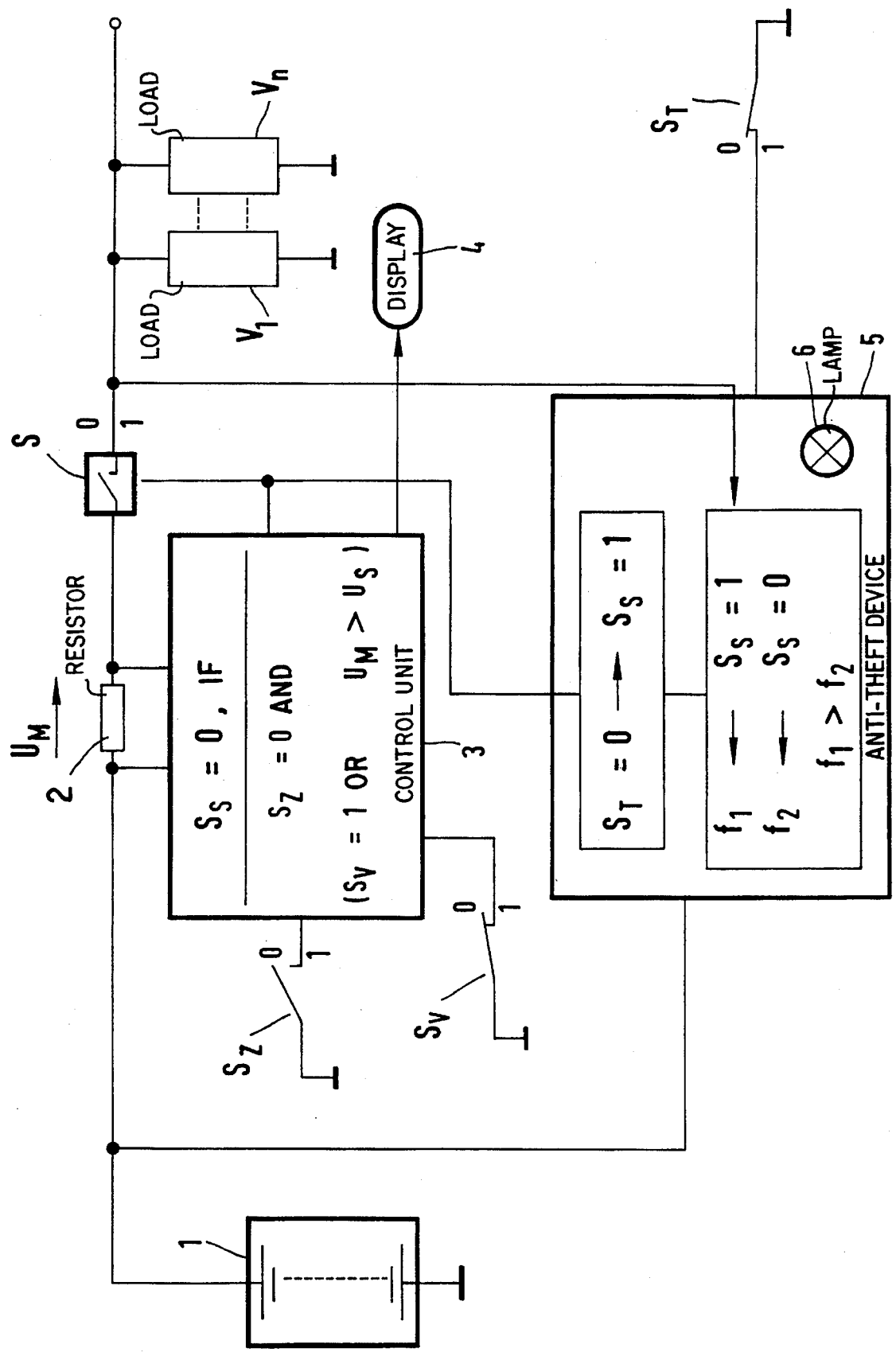

SWITCH ARRANGEMENT FOR REDUCING THE CLOSED CIRCUIT CURRENT WHEN MOTOR VEHICLES ARE PARKED

SUMMARY OF THE INVENTION

This invention relates to a switch arrangement for reducing the closed circuit current when motor vehicles are parked and, more particularly, to a switch arrangement including a controllable switch for essentially centrally disconnecting all power supply consuming devices from the motor vehicle battery.

Such a switch arrangement is known, for example, from German Patent document DE 37 42 312 A1. In the case of this known switch arrangement, all power supply consuming devices will be switched off when, in the case of a withdrawn ignition key, the vehicle battery voltage falls below a lower limit value. From German Patent document DE 40 40 405 A1, another switch arrangement for reducing the closed circuit current when vehicles are parked is known. In this reference, by means of each locking operation of a motor vehicle door, all power supply consuming devices are also disconnected from the motor vehicle battery. In the case of these switch arrangements, all power supply consuming devices are switched off. This is problematic because certain power supply consuming devices should remain on, for example, for protecting against manipulation, particularly as an anti-theft device, and especially when the motor vehicles are parked.

There is therefore needed an improved switch arrangement for reducing the consumption of closed circuit current of the above-mentioned type wherein at least one electric anti-theft device remains operative.

This need is met according to the present invention by a switch arrangement for reducing the closed circuit current when a motor vehicle is parked including a controllable switch for essentially centrally disconnecting all power supply consuming devices from the motor vehicle battery. The electric supply input of an electric anti-theft device, while by-passing the controllable switch, is inseparably connected with the motor vehicle battery.

According to the present invention, the electric supply input of an electric anti-theft device, whose electric connecting line to the power supply is preferably arranged between the motor vehicle battery and the controllable switch, is inseparably connected with the motor vehicle battery. As a result, an anti-theft protection is ensured. At the same time, the consumption of the closed circuit current of all other power supply consuming devices can be reduced to a minimum by means of a single central controllable switch. In this case, the controllable switch is opened, for example, as a function of the closed circuit current flowing out of the motor vehicle battery and/or as a function of the position of a closed circuit current suppression switch to be operated manually.

In an advantageous further embodiment of the invention, the electric anti-theft device, which normally also comprises a control unit, receives an input signal which corresponds to the position of the controllable switch. This input signal is, for example, transmitted by a control unit for controlling the controllable switch to the control unit of the anti-theft device, or is formed from the voltage which ms tapped at the pole of the controllable switch connected with the power supply consuming devices to be separated. Furthermore, the electric anti-theft device is connected with at least one manually operable switch for sensitizing and desensitizing the anti-theft device. The position of the manually operable switch is queried by the electric anti-theft device, particularly in the sensitized condition, in which case, When the controllable switch is open, this query takes place less frequently than when the controllable switch is closed. By means of this further embodiment according to the invention, the consumption of closed circuit current is even further reduced in that the electric supply requirement of the electric anti-theft device, which is still connected with the vehicle battery, is also reduced.

In another advantageous embodiment of the invention, an equipment-on indicator lamp assigned to the anti-theft device is controlled such that, when the controllable switch is open, it flashes less often and/or more briefly than when the controllable switch is closed. This measure according to the present invention leads to a further reduction of the electric supply requirement of the anti-theft device and thus of the consumption of the closed circuit current. Furthermore, by means of the frequency or the duration of the flashing pulse of the equipment-on indicator lamp, the driver can determine whether the controllable switch is open or closed, or whether the disconnecting of the power supply consuming devices from the motor vehicle battery has taken place.

In another advantageous further embodiment of the present invention, the opened controllable switch will be closed again when the manually operable switch for sensitizing and desensitizing the anti-theft device was brought into the desensitizing position. In this case, for example, the anti-theft device itself can carry out the closing of this switch so that a possibly existing control unit for controlling the controllable switch can also be disconnected from the battery when the controllable switch is open. This further embodiment according to the invention also further improves the reduction of the closed circuit current consumption.

In yet another advantageous further embodiment of the invention, when the switch is closed again, a warning is triggered which points to the previously opened controllable switch. This warning may take place, for example, acoustically, by means of controlling the equipment-on indicator lamp different from the normal flashing operation of the equipment-on indicator lamp, or by means of a visual display in the combined instrument. In the case of a visual display in the combined instrument, more detailed information may also be supplied. Such detailed information displays, for example, why the controllable switch was opened. A request to drive to a repair shop may, for example, be emitted if the controllable switch was opened by an extremely high closed circuit current which indicates, for example, the existence of a short circuit.

Other objects, advantages and novel features of the present invention will become apparent from the following detailed description of the invention when considered in conjunction with the accompanying drawings.

BRIEF DESCRIPTION OF THE DRAWINGS

The FIGURE is a schematic diagram showing a switch arrangement according to the invention, with a control unit for controlling the controllable switch and a control unit of an electric anti-theft devices.

DETAILED DESCRIPTION OF THE DRAWINGS

Referring to the FIGURE, the motor vehicle battery, in the following called battery 1, is connected by way of a precision resistor 2 with a first pole of the controllable switch $S_S$.

The second pole of the controllable switch $S_S$ is connected to the power supply consuming devices $V_1$ to $V_n$. One electric line respectively in front of and behind the precision resistor 2 leads to a control unit 3 which controls the controllable switch $S_S$. By means of these two electric lines, the voltage $U_M$, which drops at the precision resistor 2, is fed to the control unit as the first input signal.

Particularly when a motor vehicle is parked, the voltage $U_M$ is directly proportional to the closed circuit current flowing from the battery 1. The control unit 3 also receives input signals from the ignition lock switch $S_Z$ and from the preselection switch $S_V$. A first output signal of the control unit 3 is the control signal for closing or opening the controllable switch $S_S$. The "O" position of the controllable switch $S_S$ corresponds to the open condition; the "1" position corresponds to the closed condition of the controllable switch $S_S$. A second output signal from the control unit 3 leads to a warning display 4 which, when the motor vehicle is started, displays for example, in the combination instrument, the previously opened controllable switch $S_S$ or the disconnecting of the power supply consuming devices $V_1$ to $V_n$ from the battery 1.

Furthermore, the battery 1 is connected with a supply input of an electric anti-theft device 5. In addition, the door lock switch $S_T$ is connected to another input of the anti-theft device 5. An electric line, which is connected to the pole of the controllable switch $S_S$ connected to the power supply consuming devices $V_1$ to $V_n$, leads as the third input line to the anti-theft device 5. By way of the signal of this third input line, the anti-theft device 5 recognizes whether the switch $S_S$ is in the "O" position and therefore open, or in the "1" position and therefore closed. When, for example, 0 Volt are applied to this third electric input line, the controllable switch $S_S$ is in the "O" position; however, when 12 Volts are applied to this third electric input line, the controllable switch $S_S$ is in the "1" position. For controlling the controllable switch $S_S$, an output of the anti-theft device 5 is connected with this switch $S_S$.

The control unit 3 for controlling the controllable switch $S_S$ opens up the switch; i.e., $S_S=0$, when the ignition lock switch $S_Z$ is open; i.e., $S_Z=0$, add when, at the same time, either the preselection switch $S_V$ is closed; i.e., $S_V=1$, or the voltage $U_M$ is higher than a given voltage threshold $U_S$; i.e., $U_M>U_S$. In this case, the preselection switch $S_V$ is a manually operable closed circuit suppression switch which is closed by the driver when an extended parking of the motor vehicle is intended. When the motor vehicle is started, for example, the opening of this preselection switch $S_V$ may be carried out automatically or arbitrarily by the driver. The given voltage threshold $U_S$ corresponds to a given closed circuit current threshold which must not be exceeded because otherwise the discharging of the battery 1 would be too fast. When the conditions for opening the controllable switch $S_S$ exist, the controllable switch $S_S$ will preferably be opened only after a given delay time which is measured from that point in time at which the ignition lock switch $S_Z$ was opened up. This delay time ensures automatically carried-out final measures in the power supply consuming devices $V_1$ to $V_n$.

When the controllable switch $S_S$ is open in the parked motor vehicle, the anti-theft device 5 continues to be electrically supplied by the battery 1. In the sensitized condition, the anti-theft device 5 preferably cyclically queries the door lock switch $S_T$ which, for the purpose of desensitizing the anti-theft device 5, for example, must be open; i.e., $S_T=0$. When the controllable switch $S_S$ is closed; that is, the existing closed circuit is sufficiently low or the charge of the battery 1 is sufficiently high, the cyclical querying of the door lock switch $S_T$ is carried out at a frequency $f_1$. When the switch $S_S$ is open; that is, the battery 1 is to be saved by a reduction, which is as good as possible, of the closed circuit current consumption, the cyclical querying of the door lock switch $S_T$ takes place at a frequency $f_2$ which is much lower than the frequency $f_1$. This means that the querying of the door lock switch $S_T$ takes place at larger intervals when the controllable switch $S_S$ is open. Preferably, the anti-theft device 5 is connected with an equipment-on indicator lamp 6 which flashes corresponding to the querying frequencies $f_1$ and $f_2$. In this case, while the equipment-on indicator lamp 6 is flashing, it is possible, by means of a frequency which corresponds to the frequency $f_2$, to also shorten the flashing duration in comparison to the flashing duration during the flashing by means of the frequency corresponding to frequency $f_1$.

This embodiment according to the present invention provides for reducing to a minimum the consumption of closed circuit current when the motor vehicle is parked by means of a single central controllable switch, while the anti-theft protection is nevertheless maintained. Furthermore, the driver is informed at the same time after the disconnecting of the power supply consuming devices from the motor vehicle battery so that he is not surprised at the resulting consequences.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A switch arrangement for reducing closed circuit current from a vehicle battery when a motor vehicle is parked, comprising:

a controllable switch coupled to the vehicle battery for centrally disconnecting power supply consuming devices in the motor vehicle from the vehicle battery; and an electric anti-theft device operatively arranged in the motor vehicle having an electric supply input inseparably connected with the vehicle battery while bypassing said controllable switch.

2. A switch arrangement according to claim 1, further comprising:

a manually operable switch for sensitizing and desensitizing the anti-theft device;

wherein the electric anti-theft device receives an input signal which corresponds to a position of the controllable switch and queries the position of the manually operable switch for sensitizing and desensitizing the anti-theft device at a laser frequency when the controllable switch is open than when the controllable switch is closed.

3. A switch arrangement according to claim 1, further comprising an equipment-on indicator lamp assigned to the anti-theft device, said indicator lamp being controlled such that it flashes at a laser frequency when the controllable switch is open than when the controllable switch is closed.

4. A switch arrangement according to claim 2, further comprising an equipment-on indicator lamp assigned to the anti-theft device, said indicator lamp being controlled such that it flashes at a laser frequency when the controllable switch is open than when the controllable switch is closed.

5. A switch arrangement according to claim 2, wherein an open state of said controllable switch is closed when the manually operable switch for sensitizing and desensitizing the anti-theft device is brought into the desensitizing position.

6. A switch arrangement according to claim 3, wherein an open state of said controllable switch is closed when the manually operable switch for sensitizing and desensitizing the anti-theft device is brought into the desensitizing position.

7. A switch arrangement according to claim 1, further comprising:
   a warning device;
   wherein when the controllable switch is closed, the warning device is activated which points to the previously opened controllable switch.

8. A switch arrangement according to claim 2, further comprising:
   a warning device;
   wherein when the controllable switch is closed, the warning device is activated which points to the previously opened controllable switch.

9. A switch arrangement according to claim 3, further comprising:
   a warning device;
   wherein when the controllable switch is closed, the warning device is activated which points to the previously opened controllable switch.

10. A switch arrangement according to claim 5, further comprising:
    a warning device;
    wherein when the controllable switch is closed, the warning device is activated which points to the previously opened controllable switch.

11. A switch arrangement according to claim 1, further comprising an equipment-on indicator lamp assigned to the anti-theft device, said indicator lamp being controlled such that it flashes at a lesser frequency and for a shorter period of time when the controllable switch is open than when the controllable switch is closed.

12. A switch arrangement according to claim 1, further comprising an equipment-on indicator lamp assigned to the anti-theft device, said indicator lamp being controlled such that it flashes for a shorter period of time when the controllable switch is open than when the controllable switch is closed.

13. A switch arrangement according to claim 2, further comprising an equipment-on indicator lamp assigned to the anti-theft device, said indicator lamp being controlled such that it flashes at a lesser frequency and for a shorter period of time when the controllable switch is open than when the controllable switch is closed.

14. A switch arrangement according to claim 2, further comprising an equipment-on indicator lamp assigned to the anti-theft device, said indicator lamp being controlled such that it flashes for a shorter period of time when the controllable switch is open than when the controllable switch is closed.

15. A switch arrangement for reducing closed circuit current from a vehicle battery when a motor vehicle is parked, comprising:
    a controllable switch coupled to the vehicle battery for centrally disconnecting power supply consuming devices in the motor vehicle from the vehicle battery when a voltage consumption of said power supply consuming devices exceeds a predetermined threshold; and
    an electric anti-theft device operatively arranged in the motor vehicle having an electric supply input inseparably connected with the vehicle battery while bypassing said controllable switch so as to maintain an anti-theft protection when the power supply consuming devices are disconnected.

* * * * *